United States Patent [19]

Riedl

[11] Patent Number: 5,064,279
[45] Date of Patent: Nov. 12, 1991

[54] BINOCULAR TELESCOPE INCLUDING A DOUBLE-JOINTED BRIDGE AND CENTRAL JOINT FOCUSING

[75] Inventor: Bernhard Riedl, Tirol, Austria

[73] Assignee: Swarovski & Co., Wattens, Austria

[21] Appl. No.: 575,402

[22] Filed: Aug. 29, 1990

[30] Foreign Application Priority Data

Sep. 7, 1989 [DE] Fed. Rep. of Germany ....... 3929825

[51] Int. Cl.⁵ ........................... G02B 7/06; G02B 7/17
[52] U.S. Cl. .................................................. 350/554
[58] Field of Search ............... 350/554, 553, 555, 556, 350/548, 549, 550, 552

[56] References Cited

U.S. PATENT DOCUMENTS 2,811,895  11/1957  Jenson ................................ 350/552
3,712,704   1/1973  Sato .................................... 350/554

FOREIGN PATENT DOCUMENTS 207332   1/1987  European Pat. Off. ............ 350/552
2950204  7/1980  Fed. Rep. of Germany ...... 350/552

Primary Examiner—Jon W. Henry
Attorney, Agent, or Firm—Fay, Sharpe, Beall, Fagan, Minnich & McKee

[57] ABSTRACT

A binocular telescope having a double-jointed bridge and a central joint focusing means for focusing and diopter adjustment with a bipartite bridge, the two bridge members being connected via a center clutch shaft.

2 Claims, 1 Drawing Sheet

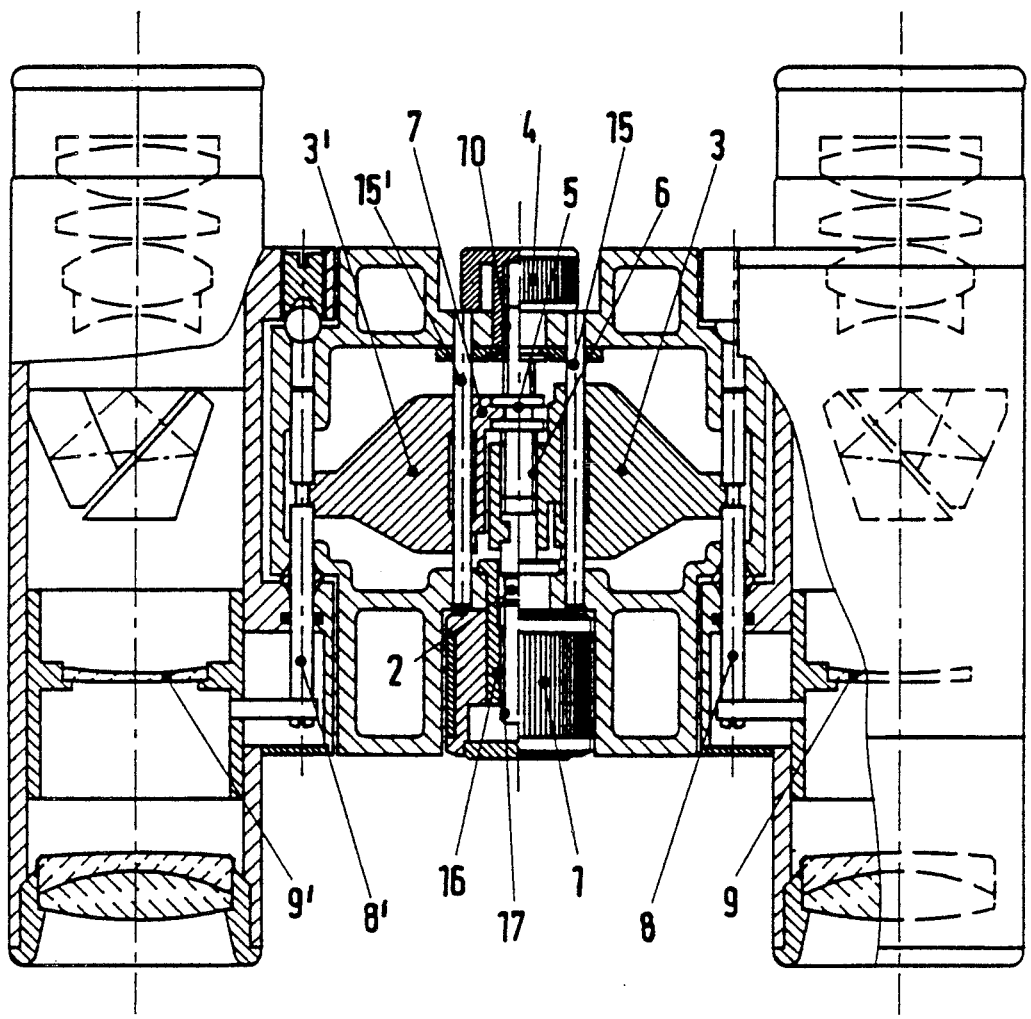

BINOCULAR TELESCOPE INCLUDING A DOUBLE-JOINTED BRIDGE AND CENTRAL JOINT FOCUSING

The present invention relates to a binocular telescope having a double-jointed bridge and a central joint focusing means for focusing and diopter adjustment.

A binocular telescope having a double bridge and a central joint focusing means for focusing is already known from German patent no. 24 24 792. However, the joint focusing means cannot be used for diopter adjustment.

German patent no. 29 48 421 discloses a binocular telescope having a double-jointed bridge, but the focusing is not performed by a joint focusing means. The pinion knobs for focusing and diopter adjustment are disposed on the swiveling axes.

German utility model no. 84 04 136 discloses a joint focusing means for internal focusing of telescopes. In this construction the entire stroke and the bridge are disposed in the drive wheel, which must therefore be of undesirably large dimensions. Also, in the known construction the pinions for focusing and diopter balance are disposed on opposite sides, which complicates assembly, adjustment and repair.

German patent no. 35 24 152 provides for diopter adjustment a diopter adjustment wheel which engages the clutch shaft via a driving gearwheel, an intermediate gearwheel and a driven gearwheel. The intermediate gearwheel is disposed on the diopter adjustment side and guided through, or laterally past, the bridge. Its height is such that the driven gearwheel engages the intermediate gearwheel through the total stroke area of focusing.

The invention is based on the problem of providing a binocular telescope having a double-jointed bridge wherein both the focusing and the diopter adjustment are performed via a central joint focusing means.

The invention is based on the finding that this problem can be solved by a joint focusing means comprising a bridge consisting of two parts connected by a rotatingly adjustable coupling member.

The object of the invention is a binocular telescope having a double-jointed bridge and a central joint focusing means for focusing and diopter adjustment wherein a focusing wheel engages a displaceable bridge via a threaded spindle, and the objectives are connected with the displaceable bridge via clutch shafts for the purpose of focusing, and a diopter adjustment wheel engages one of the clutch shafts to change the position of an objective for diopter adjustment, said telescope being characterized in that the bridge comprises a first member firmly connected with the threaded spindle, and a second member connected with the first member by a thread via a clutch shaft driven by the diopter adjustment wheel, the second bridge member being taken along by the clutch shaft in the axial direction to displace the first bridge member relative to the second bridge member.

According to a preferred embodiment the bridge members are guided in motion rods to avoid excessive play.

Further details and embodiments of the invention shall be explained in more detail with reference to an exemplary embodiment shown schematically in the drawing.

The FIGURE shows from the top the joint focusing means of a binocular telescope for focusing and diopter adjustment.

Focusing wheel 1 is for focusing. It has an inside thread 16 which is in operative connection with outside thread 17 of threaded spindle 2. When focusing wheel 1 is rotated there is an axial displacement of threaded spindle 2. Spindle 2 is firmly connected with first bridge member 3. Second bridge member 3' is in turn connected via center clutch shaft 5 with the first bridge member. When threaded spindle 2 is axially displaced, first bridge member 3 and second bridge member 3' are thus axially displaced by equal amounts. Bridge members 3, 3' are in turn connected with first and second clutch shafts 8, 8' which transmit the axial movement to objective focusing lenses 9, 9' for the purpose of focusing.

To avoid play it is advantageous to guide the bridge members, in particular second bridge member 3', in motion rods 15, 15'.

The diopter adjustment is performed via diopter adjustment wheel 4, which is connected in axially displaceable fashion with a clutch shaft 5 by splines 10. Center clutch shaft 5 is connected via a thread 6 with first bridge member 3, whereby center clutch shaft 5 has an outside thread and first bridge member 3 has an inside thread. Second bridge member 3' is connected with center clutch shaft 5 via a carrier 7 for the purpose of axial displacement, but center clutch shaft 5 rotates freely in second bridge member 3'. When the diopter adjustment wheel is rotated there is an axial displacement of center clutch shaft 5 and thus also, via carrier 7, of second bridge member 3' relative to first bridge member 3. This relative axial displacement is transmitted via second clutch shaft 8' to objective focusing lens 9' for diopter adjustment.

I claim:

1. A binocular telescope having a double-jointed bridge and a central joint focusing means for focusing and diopter adjustment wherein a focusing wheel (1) engages a displaceable bridge (3, 3') via a threaded spindle (2), and the objectives are connected with the displaceable bridge (3, 3') via first and second clutch shafts (8, 8') for the purpose of focusing, and a diopter adjustment wheel (4) engages the second clutch shaft (8') to change the position of an objective for diopter adjustment, characterized in that the bridge comprises a first member (3) firmly connected with the threaded spindle (2), and a second member (3') connected with the first member (3) by a thread (6) via a center clutch shaft (5) driven by the diopter adjustment wheel (4), the second bridge member (3') being taken along by the center clutch shaft (5) in the axial direction relative to the first bridge member (3).

2. The binocular telescope of claim 1, characterized in that the bridge members (3, 3') are guided in motion rods (15, 15').

* * * * *